United States Patent [19]

Fileti et al.

[11] Patent Number: 5,612,078
[45] Date of Patent: Mar. 18, 1997

[54] FILLER CREAM COMPOSITIONS FOR REDUCED FAT SANDWICH COOKIES

[75] Inventors: Christina M. Fileti, Hackensack; Richard C. Gill, Randolph; Mark J. Ramundo, Clifton; Lis K. Renini, Mercerville, all of N.J.

[73] Assignee: Nabisco, Inc., Parsippany, N.J.

[21] Appl. No.: 287,318

[22] Filed: Aug. 8, 1994

[51] Int. Cl.⁶ ........................................ A23C 13/00
[52] U.S. Cl. .............................. 426/572; 426/659; 426/94
[58] Field of Search ....................................... 426/659, 694, 426/572

[56] References Cited

U.S. PATENT DOCUMENTS

| | | |
|---|---|---|
| 2,132,395 | 10/1938 | Coith et al. . |
| 2,172,211 | 9/1939 | Lloyd . |
| 2,359,228 | 9/1944 | Lloyd et al. . |
| 2,935,408 | 5/1960 | Steinitz . |
| 2,954,297 | 9/1960 | Eisesser et al. . |
| 3,244,536 | 4/1966 | Kidger . |
| 3,585,046 | 6/1971 | Schaible et al. . |
| 3,656,967 | 4/1972 | Barton et al. . |
| 3,692,535 | 9/1972 | Norsby et al. . |
| 3,833,741 | 9/1974 | Katz et al. . |
| 4,310,557 | 1/1982 | Suggs et al. . |
| 4,391,832 | 7/1983 | Haas, Sr. et al. . |
| 4,610,884 | 9/1986 | Lewis, III et al. . |
| 4,661,360 | 4/1987 | Smith . |
| 4,661,366 | 4/1987 | Pinto et al. . |
| 4,664,927 | 5/1987 | Finkel . |
| 4,670,272 | 6/1987 | Chen et al. . |
| 4,711,788 | 12/1987 | Porcello et al. . |
| 4,721,622 | 1/1988 | Kingham et al. . |
| 4,752,494 | 6/1988 | Tang et al. . |
| 4,753,812 | 6/1988 | Wilson et al. . |
| 4,812,318 | 3/1989 | Finkel . |
| 4,826,696 | 5/1989 | Wilson et al. . |
| 4,834,991 | 5/1989 | Porcello et al. . |
| 4,865,859 | 9/1989 | Porcello et al. . |
| 4,980,192 | 12/1990 | Finkel . |
| 5,004,623 | 4/1991 | Gidday et al. . |
| 5,102,680 | 4/1992 | Glass et al. . |
| 5,154,942 | 10/1992 | Hirschey et al. . |
| 5,202,147 | 4/1993 | Traska et al. . |
| 5,215,757 | 6/1993 | El-Nokaly . |
| 5,246,727 | 9/1993 | Finkel . |
| 5,304,389 | 4/1994 | Kondo et al. . |
| 5,366,750 | 11/1994 | Morano ................................. 426/572 |
| 5,374,438 | 12/1994 | Yost ................................. 426/607 X |
| 5,376,397 | 12/1994 | Gaonkar . |
| 5,376,399 | 12/1994 | Dreese et al. ...................... 426/572 X |

FOREIGN PATENT DOCUMENTS

| | | |
|---|---|---|
| 0664083A1 | 7/1995 | European Pat. Off. . |
| WO91/18522 | 12/1991 | WIPO . |
| WO92/09209 | 6/1992 | WIPO . |
| WO94/14338 | 7/1994 | WIPO . |

*Primary Examiner*—Carolyn Paden

[57] ABSTRACT

A substantially anhydrous filler cream for reduced fat sandwich cookies which retains injected air for extended periods of time is produced by replacing a substantial portion of the filler cream fat with a polyol, preferably glycerol. Exemplary replacement ratios may range from about 0.85 to about 1.6 parts by weight of polyol per part by weight of oleaginous composition or fat replaced. The polyol also provides lubricity for a smooth mouthfeel to compensate for the reduced amount of oleaginous composition. Excessive adhesion or gluing of the filler cream to the sandwich cookie base cake does not result from replacement of a portion of the oleaginous composition with the polyol. Polyol and fat separation is avoided prior to, during, and after aeration using emulsifiers which comprise at least about 80% by weight, preferably at least about 90% by weight monoglycerides and have an iodine value of at least 60, for example, from about 80 to about 120, preferably from about 90 to about 115. Monoglycerides from unsaturated fatty acids are preferred for the filler creams of the present invention. Monoglycerides derived from sunflower oil are most preferred in the present invention. Prevention of separation of the polyol and fat and the avoidance of lump formation is achieved without adversely affecting taste, machinability, aeration, appearance, or texture of the filler cream.

29 Claims, No Drawings

FILLER CREAM COMPOSITIONS FOR REDUCED FAT SANDWICH COOKIES

FIELD OF THE INVENTION

This invention relates to filler creams for reduced fat baked products, methods for making filler creams with decreased amounts of fat, and to reduced fat products containing the filler cream products.

BACKGROUND OF THE INVENTION

Filler cream compositions for sandwich cookies are generally comprised of sucrose or sucrose in combination with other sugars, flavorings, and oils or fats. Variations of the ingredients of a filler cream composition can lead to significantly different properties in a filler cream. Sugar combinations can cause a filler cream to be too sweet for eating in large quantities or, if artificial sweeteners are used, the filler cream can be too bitter for consumer acceptance.

The shortening, oil or fat used in filler creams can be a single oil or fat or a mixture of oils or fats. For purposes of this invention any shortening, oil or fat or mixtures thereof used in a filler composition is identified by the term "oleaginous composition". Desirable oleaginous compositions used in filler creams for sandwich cookies are firm, but soft or "spreadable" at ordinary storage temperatures. The oleaginous compositions must have good whipping and creaming properties that develop a filler cream with a light, consistent texture during whipping and aeration process steps. Also, desirable oleaginous compositions provide a palatable flavor with little or no after taste and produce a filler cream that dissolves rapidly at body temperature when consumed. Oleaginous compositions used in commercial filler creams must exhibit good shelf storage properties.

U.S. Pat. No. 4,610,884 to Lewis III et al and U.S. Pat. Nos. 4,711,788, 4,834,991, and 4,865,859 to Porcello et al disclose filler cream compositions which exhibit "quick get away" characteristics. The solid fat index (SFI) profile of the fat as well as the amount of aeration are used to control the rate at which the filler cream melts in the mouth. According to U.S. Pat. No. 4,610,884 emulsifiers aid in the incorporation of air into the cream as well as the dispersion of the cream in the mouth.

In the preparation of filler creams fat "traps" the air that is introduced into the cream in a scraped surface heat exchanger such as a Votator. The "trapped air" in the cream makes the creams less dense thereby producing a lighter mouthfeel in the final product. Reducing the fat content of a filler cream may, prior to aeration, increase the specific gravity of the composition to 1.4 or more. Fat also provides flavor and tenderness to the final product. Methods for making low-fat filler creams must somehow compensate for the multiple functions of fat when reducing or eliminating fat.

Admixing a polyol such as glycerine or sorbitol with a fat or oil to increase the viscosity of the fat or oil is disclosed in U.S. Pat. Nos. 4,664,927, 4,812,318, 4,980,192 and 5,246,727. However, use of a polyol to increase the air holding ability of reduced fat filler creams is not disclosed. In addition, it has been found that replacing a portion of the fat in a filler cream with glycerine to reduce the fat content in the product results in lump formation, during votation. Also, the glycerine separates from the fat, and the flow of the creme in the votator is impeded even in the presence of flow improvers such as lecithin.

U.S. Pat. No. 5,154,942 to Hirschey et al. discloses an aerated reduced-fat creme comprising starch and vegetable shortening. The starch and shortening, it is disclosed, will not form an aerated cream unless a polyglycerol ester and an alkali stearoyl lactylate are used in combination as an emulsifier. However, this creme will not function properly as a "sandwich" material between two base cakes over extended periods of time because of the high water content. If this filling were used as "sandwich" material the moisture in the filling would migrate to the base cakes thereby causing the base cakes to become "soft" and more prone to breaking and the filling to become hard.

The present invention provides an aerated filler cream for making reduced fat sandwich cookies and other foods that is soft at room temperature yet is structurally stable during simulated adverse transport conditions. The filler creams exhibit the taste and specific gravity of their high-fat counterparts. However, the filler creams of the present invention have the added advantage of having substantially lower fat contents, for example from 10% to 50% by weight less fat, preferably at least 20%, most preferably at least 25% by weight less fat.

SUMMARY OF THE INVENTION

The present invention provides a substantially anhydrous reduced fat filler cream for sandwich cookies which retains injected air for extended periods of time of at least two months, preferably at least four months, when packaged in proper packaging. A polyol, preferably glycerol, is used to replace a substantial portion of an oleaginous composition without substantially decreasing the air holding capacity of the filler cream. In embodiments of the invention, replacement ratios may range from about 0.85 to about 1.6 parts by weight of polyol per part by weight of oleaginous composition or fat replaced. Generally the polyol may be used in amounts of less than about 20% by weight, preferably less than about 15% by weight but at least about 5% by weight of the filler cream. Exemplary amounts of the polyol range from about 7% by weight to about 12% by weight. The polyol also provides body and lubricity for a smooth mouth feel to compensate for the reduced amount of oleaginous composition. Excessive adhesion or cementing of the filler cream to the sandwich cookie base cake does not result from replacement of a portion of the oleaginous composition with the polyol. Thus, slight twisting action applied by the hand results in an easy or clean removal of a base cake from the filler cream. For example, at least about 75% by weight, preferably substantially all of the filler cream is retained by the other base cake upon "twisting off" a base cake with slight tangential force applied to the perimeter of one or both base cakes. The separation may be achieved without breaking of the base cake and with little or at least substantially no adherence or retention of the filler cream upon the base cake which is twisted off from the remainder of the sandwich cookie.

The filler cream compositions of the present composition also include an emulsifier for preventing separation of the polyol from the oleaginous composition. The emulsifier also improves mouthfeel and air holding capacity of the filler cream. Prevention of separation and the avoidance of lump formation is achieved without adversely affecting taste, machinability, aeration, appearance, or texture of the filler cream. In embodiments of the present invention, separation is avoided prior to, during, and after aeration using emulsifiers which comprise at least about 80% by weight, preferably at least about 90% by weight monoglycerides. The emulsifier may generally have an iodine value of at least about 60, for example from about 80 to about 120, preferably from about 90 to about 115. Monoglycerides from unsaturated fatty acids are preferred for the filler creams of the present invention. Monoglycerides derived from canola or low erucic rape seed oil, cottonseed oil, sunflower oil, soybean oil, or mixtures thereof are preferred. Monoglycerides derived from sunflower oil are most preferred in the present invention.

In embodiments of the present invention, the fat content or the amount of the oleaginous composition is reduced to less than about 30% by weight, based upon the total weight of the filler cream. The amount of the oleaginous composition may generally range from about 20% by weight to about 30% by weight, based upon the total weight of the oleaginous composition and at least one sugar.

The reduced fat filler cream compositions of the present invention may be produced by admixing the oleaginous composition, with the emulsifier, and then with the polyol, to obtain a substantially lump-free homogeneous emulsion. The emulsion may then be admixed with at least one sugar at a temperature which is sufficiently low so as to avoid separation of the oleaginous composition and the polyol. The mixing may be performed to obtain a substantially homogeneous slurry into which air is injected. The slurry and air are admixed with cooling to obtain a filler cream composition having a specific gravity of less than about 1.3, preferably from about 0.7 to about 1, most preferably from about 0.85 to about 0.95.

The substantially anhydrous filler creams of the present invention may have a water content of less than about 5% by weight, preferably less than about 3% by weight, most preferably less than about 1% by weight based upon the total weight of the filler cream. In embodiments of the invention, the filler creams have a water activity or relative humidity of less than about 0.35, preferably less than about 0.3. Reduced fat sandwich cookies comprising the filler cream disposed between two base cakes may have a water content of less than about 3.5% by weight of the sandwich cookie and a water activity or relative humidity of less than about 0.4, preferably less than about 0.35.

DETAILED DESCRIPTION Of THE INVENTION

The fat content of a substantially anhydrous filler cream for sandwich cookies is reduced in accordance with the present invention by replacing a substantial portion of the shortening or fat of the filler cream with a polyol and an emulsifier. The polyol increases the air holding capacity, the body, and the lubricity of the filler cream which would otherwise be diminished by the lower levels of oleaginous composition. In embodiments of the invention, the reduced fat filler creams of the invention may be aerated to reduce the specific gravity to less than about 1.3. Aerated reduced fat filler creams of the present invention preferably have a specific gravity of about 0.7 to about 1, most preferably from about 0.85 to about 0.95. Aeration provides a light texture and has a whitening effect on the filler cream. The polyol, in addition to increasing the air holding capacity of the filler cream, helps to coat the sugar particles and promotes a smooth, non-grainy lubricous mouthfeel.

To prevent separation of the polyol from the oleaginous composition either before, during or after aeration, an emulsifier is included in the filler cream composition. Generally an increase in mixing temperature facilitates coating of the sugar particles and facilitates pumping and air injection because of reduced viscosity. However, increased temperatures tend to separate the polyol and oleaginous composition. The emulsifier used in the present invention prevents the formation of lumps due to separation of oil and the polyol. It permits consistent, uniform coating of the sugar particles by the polyol and oleaginous composition. The emulsifier also helps to provide a viscosity which is low enough to permit pumping at pressures which are compatible with the injection and retention of air in the filler cream composition. Air holding capacity and mouthfeel are improved with the use of an emulsifier in accordance with the present invention.

Oleaginous compositions which may be used to obtain the reduced fat filler creams of the present invention may include any known fat blends or fat compositions used to produce filler creams. Mixtures of hard and soft fats or shortenings, and oils may be used to achieve a desired consistency or melting profile in the finished filler cream. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides as well as natural triglycerides of fatty acids may also be used to obtain the oleaginous composition. The fatty acids may have a chain length of from 8 to 24 carbon atoms.

The shortening or fat or oils and mixtures thereof may be fractionated, partially hydrogenated, and/or interesterified. Solid or semi-solid shortenings or fats at room temperatures of, for example, from about 75° F. to about 95° F. may be used. The oleaginous compositions preferably have a short "plastic range" in which there is a high solid fat content at low temperatures. In embodiments of the invention, the solid fat content above body temperature may be less than about 10% by weight or essentially zero. The term "plastic range" refers to the temperature range in which a filler cream fat or oleaginous composition is neither completely solid nor completely liquid. In this range, the filler cream fat is pliable, but not completely fluid. Preferred oleaginous compositions for use in the present invention comprise soybean oil.

As used herein, a reduced fat food product is a product having its fat content reduced by at least 25% by weight from the standard or conventional product. Reduction of the shortening or fat content of a sandwich cookie by 25% or more may be achieved by lowering the fat or shortening content of the filler cream, or the base cakes, or both the filler cream and the base cakes. In the present invention, the fat content of the filler cream is substantially lowered, for example, about 10% to about 50% by weight less fat than that of a conventional or standard filler cream. The filler creams of the present invention preferably have at least 20% by weight less fat, most preferably at least 25% by weight less fat than that of a standard or conventional filler cream. For example, in embodiments of the present invention, the amount of vegetable shortening or fat contained in standard or conventional filler creams may be decreased by at least 20% by weight to obtain sandwich cookies having a fat content which is reduced by 25% by weight or more.

Generally, the amount of the oleaginous composition is reduced to less than about 30% by weight, based upon the total weight of the filler cream without substantial loss in air holding capacity. In addition, while substantial reduction in fat content is achieved, excessive grittiness is avoided and a smooth, lubricous mouthfeel is obtained. In embodiments of the present invention, the amount of the oleaginous composition may range from about 20% by weight to about 30% by weight, based upon the total weight of the oleaginous composition and at least one sugar used in producing the filler creams.

Any edible polyol which increases the air holding capacity of the filler cream or oleaginous composition may be used in the present invention. To compensate for the reduced amount of oleaginous composition, the polyol also preferably promotes a lubricous or smooth mouthfeel and increases body of the filler cream. In addition, the polyol should have a sufficiently low water content so as to not adversely affect water activity or relative humidity of the filler cream or sandwich cookie. If the water content of the polyol is too high, water will tend to migrate from the filler cream composition to the base cake. This can result in excessive hardening of the filler cream and softening of the base cakes.

Furthermore, water migration to the base cakes tends to result in cementing or excessive adhesion of the base cakes to the filler cream. The increased adhesion may be due to the loss of lubrication caused by the use of lower amounts of oleaginous composition, which tends to lubricate the filler cream/base cake interface. Also, sugars or other filler cream components may be transported by the water to the interface and into the surface of the base cake thereby tending to increase adhesion.

In the present invention, a polyol is used to replace a portion of the oleaginous composition without resulting in excessive adhesion or cementing of the filler cream to the sandwich cookie base cake. Upon "twisting off" a base cake with slight tangential force applied to the perimeter of one or both base cakes, a base cake is easily or cleanly removed from the filler cream without breaking of the base cake. For example, at least about 75% by weight, preferably substantially all of the filler cream is retained by the other base cake. The base cake which is twisted off from the remainder of the sandwich cookie preferably retains little or substantially no filler cream.

Straight or branched chain edible hydrocarbons containing at least two hydroxyl groups on the carbon skeleton may be used as the polyol component in embodiments of the present invention. The polyols may include other functional groups such as double bonds or carboxyl groups. Polyols which are in liquid form at temperatures used to melt the oleaginous composition are preferred to facilitate mixing. Glycerin or glycerol is the preferred polyol for use in the present invention. The glycerin may be used alone or in combination with other polyols providing that the resulting polyol composition has a sufficiently low water content. Examples of polyols other than glycerin which may be used include propylene glycol, mannitol and mixtures thereof.

Sugar alcohols such as sorbitol, hydrolyzed starch hydrolyzates such as Lycasin® which comprises sorbitol and various hydrogenated polysaccharide compounds, high fructose corn syrup, and corn syrup may be included in amounts which do not adversely affect texture, pumpability, or base cake adhesion due to their relatively high water contents. In preferred embodiments of the invention, the polyol has a water content of less than about 10% by weight, preferably less than about 5% by weight, based upon the total weight of the polyols.

Commercially available forms of glycerin which may be used in the present invention include 99.7% pure glycerin and about 96% by weight pure glycerin, the balance comprising water. In embodiments of the invention, the presence of minor amounts of water in the glycerin, for example about 4% by weight, may assist in emulsification.

The weight ratio of the amount of polyol to the amount of oleaginous composition which it replaces may range, for example, from about 0.85 to about 1.6. In embodiments of the present invention, the polyol content is less than about 20% by weight, preferably less than about 15% by weight, but at least about 5% by weight, of the filler cream composition. Exemplary amounts of the polyol are from about 7% by weight to about 12% by weight, based upon the weight of the filler cream composition. Generally, the amount of polyol used will depend upon the amount of oleaginous composition replaced, the particle size of the sugar, and the amount of aeration desired.

In the present invention, an emulsifier is needed to prevent separation of the polyol from the oleaginous composition. The emulsifiers utilized in the present invention prevent separation and avoid the formation of lumps without adversely affecting taste, machinability or pumpability, aeration, appearance, or texture of the filler cream. They improve aeration or air holding capacity, and mouthfeel of the filler creams. It has been found that emulsifiers which comprise at least about 80% by weight, preferably at least about 90% by weight monoglycerides result in a stable emulsion. Stability is achieved during admixing with the oleaginous composition and polyol at elevated temperatures which are used to maintain the oleaginous composition in a liquid, flowable state. In addition, the emulsifiers used in the present invention maintain a stable emulsion during pumping, during air injection, and during mixing with cooling to form a slurry. Furthermore, the emulsifiers prevent separation of the polyol and oleaginous composition during storage of the cookies containing the filler cream over extended periods of time of at least two months, preferably at least four months.

Typical properties of emulsifiers having a monoester content of at least 90%, commercially available from Eastman Kodak are presented in Table 1:

TABLE 1

| | TYPICAL PROPERTIES OF EASTMAN KODAK EMULSIFIERS WITH AT LEAST 90% MONOESTERS | | | | | | |
|---|---|---|---|---|---|---|---|
| Type | Fat Source | Monoester Content Min. % | Glycerol Content Max % | Acid Value Max | Iodine Value | Specific Gravity at 80° C. | Melting Point, Approx. °C. (°F.) | Physical Form |
| Eastman Kodak 18-00 | Hydrogenated lard or tallow | 90 | 1.2 | 3 | 5 max | 0.91 | 68 (154) | Small Beads |
| Eastman | Hydrogenated | 90 | 1.2 | 3 | 5 max | 0.94 | 66 | Small |

TABLE 1-continued

TYPICAL PROPERTIES OF EASTMAN KODAK EMULSIFIERS
WITH AT LEAST 90% MONOESTERS

| Type | Fat Source | Monoester Content Min. % | Glycerol Content Max % | Acid Value Max | Iodine Value | Specific Gravity at 80° C. | Melting Point, Approx. °C. (°F.) | Physical Form |
|---|---|---|---|---|---|---|---|---|
| Kodak 18-04K | lard or palm stearine | | | | | | (151) | beads |
| Eastman Kodak 18-06K | Hydrogenated soybean oil | 90 | 1.2 | 3 | 5 max | 0.92 | 69 (156) | Small beads |
| Eastman Kodak 18-07K | Hydrogenated vegetable oil or cottonseed oil | 90 | 1.2 | 3 | 5 max | 0.92 | 68 (154) | Small beads |
| Eastman Kodak 18-30 | Edible beef tallow | 90 | 1.2 | 3 | 27–40 | 0.92 | 60 (140) | Plastic |
| Eastman Kodak 18-35K | Refined palm oil | 90 | 1.2 | 3 | 36–45 | 0.94 | 60 (140) | Plastic |
| Eastman Kodak 18-40 | Edible oil | 90 | 1.2 | 3 | 43–55 | 0.92 | 58 (136) | Plastic |
| Eastman Kodak 18-50K | Partially hydrogenated soybean oil | 90 | 1.2 | 3 | 50–60 | 0.94 | 54 (129) | Plastic |
| Eastman Kodak 18-85K | Cottonseed oil | 90 | 1.2 | 3 | 85–95 | 0.95 | 46 (115) | Plastic |
| Eastman Kodak 18-92K | Sunflower | 90 | 1.2 | 3 | 105–115 | 0.90 | 41 (106) | Semi-plastic |
| Eastman Kodak 18-99K | Low erucic rapeseed oil | 90 | 1.2 | 3 | 90–95 | 0.93 | 35 (94) | Semi-plastic |

Emulsifiers having a high iodine value, generally at least about 60, for example from about 80 to about 120, preferably from about 90 to about 115, have been found to provide stable emulsions with consistent flow properties during pumping. Preferred emulsifiers are monoglycerides from unsaturated fatty acids. Monoglycerides which are derived from canola or low erucic rape seed oil, cottonseed oil, sunflower oil, soybean oil, or mixtures thereof are preferred. Most preferred as emulsifiers in the present invention are monoglycerides derived from sunflower oil. Exemplary of other emulsifiers which may be used in the present invention are monoglycerides of vegetable oil.

In preferred embodiments of the present invention, commercially available Dimodan LSK is used as the emulsifier. Dimodan LSK is available from Grindsted Products, Inc., 201 Industrial Parkway, P.O. Box 26, Industrial Airport, Kans. It is a distilled monoglyceride made from refined sunflower oil. Dimodan LSK is a water-in-oil emulsifier having a monoester content of at least 90% by weight, an iodine value of about 105 to about 115, a maximum free fatty acid content of 1.5%, a maximum free glycerol content of 1%, and a clear melting point of about 50° C. (122° F.). Its form is soft plastic and it contains added antioxidant of no more than 200 ppm BHT and no more than 200 ppm citric acid. The Dimodan LSK has been found to provide a homogeneous emulsion which is quick and easy to pump, avoids excessive back pressure, provides constant flow, does not result in any glycerin-fat separation, provides increased aeration, and improved mouthfeel.

The emulsifier content of the filler creams of the present invention is generally less than about 3% by weight. Exemplary amounts range from about 0.25% by weight to about 2% by weight, based upon the weight of the filler cream composition.

The sugar used is preferably sucrose, but the sugar can be a combination of sucrose with other solid or crystalline sugars including fructose, dextrose, lactose, maltose, and mixtures thereof. One or more starches, or other carbohydrate carriers with artificial sweeteners may also be used.

Exemplary amounts of the at least one sugar which may be used in the present invention are at least about 50% by weight, preferably at least about 60% by weight, generally up to about 75% by weight, based upon the weight of the filler cream composition.

Commercially available sugars, such as finely granulated table sugar, or 4×, 6×, 10×, or 12×sugars or mixtures of sugars may be used in the present invention. Generally, as a filler cream's weight percent of oleaginous composition decreases, the filler may be perceived as less creamier and more gritty as the particle size of the sugar increases. However, in the present invention, the polyol promotes a creamy, non-gritty texture at low weight percentages of oleaginous compositions thereby permitting the use of coarser or larger particle size sugars such as 4×or 6×. The use of relatively coarse sugars, such as 4×sugar, permits more complete or thicker coating of the sugar particles by the oleaginous composition and glycerin because there are fewer sugar particles available for coating. Better coating of the particles facilitates pumping and continuous, consistent flow through piping and processing equipment.

The filler creams of this invention may include additives which do not adversely affect pumpability, formability, set-up time, aeration, mouthfeel, taste, or smoothness of the filler cream. Exemplary of additives which may be used are a stiffener ingredient, a stabilizer, a flavoring, and mixtures thereof. An exemplary stiffener is non-fat milk powder which can be added in an amount between about 3 percent and about 10 percent by weight based upon the weight of the filler cream. Excessive amounts of non-fat milk powder may cause the final texture of the filler cream to have a "gritty" mouthfeel. Dextrose and/or edible fused silica can be used in amounts up to about 10 percent by weight as a stabilizer for the filler cream, based upon the weight of the filler cream. In amounts above about 5 percent, dextrose tends to impart a cooling sensation to the filler cream during consumption.

Exemplary amounts of flavorings which can be added to the filler cream range up to about 1 part by weight of flavoring, based upon the weight of the filler cream. Examples of flavorings which can be used are vanilla, chocolate, coffee, and peppermint. Numerous flavorings and extracts are commercially available for use in the present invention. Vanilla is the preferred flavoring.

The filler creams of the present invention are at least substantially anhydrous so as to avoid lumping, separation, and pumping problems during their production. Minimization of the water content also reduces water migration between the filler cream and the sandwich cookie base cakes. Excessive adhesion of the cream to the base cakes, softening of the base cakes, and hardening of the filler cream is also avoided. In embodiments of the present invention, at least substantially anhydrous filler creams of the present invention may have a water content of less than 5% by weight, preferably less than about 3% by weight, most preferably less than about 1% by weight, based upon the total weight of the filler cream. The finished filler creams of the present invention may have a water activity or relative humidity of less than about 0.35, preferably less than about 0.3.

The filler creams of this invention may be prepared by first heating the oleaginous composition to between about 105° F. and about 135° F. to liquefy it. Premixing of the oleaginous composition with the emulsifier prior to addition of the polyol is preferred for achieving homogeneity and good aeration. The one or more emulsifier, the one or more polyol, flavoring, and all other non-sugar ingredients may then be sequentially added to the heated oleaginous composition with mixing to obtain a substantially homogeneous emulsion. The mixture is then held until the temperature of the mixture returns to between about 105° F. and about 135° F. The oil mix and the one or more sugars may then be combined and admixed with heating at a temperature which is low enough to avoid lumping and separation of the polyol and oleaginous composition. However, the temperature should be high enough to maintain a viscosity which permits downstream pumping and aeration. Mixing of the oil mixture and sugars may be accomplished in a conventional jacketed continuous mixer or other mixing device. The sugar is not dissolved in the oleaginous composition, but is added with mixing to form a suspension or slurry. Exemplary mixing temperatures may range from about 85° F. to about 105° F., preferably from about 90° F. to about 100° F., as measured on the slurry exiting from the mixer.

The slurry may then be transferred to an agitated holding tank and then pumped through a scraped wall heat exchanger such as a Votator. The air may be injected into the slurry using a mixing "T" at the inlet of the Votator. In the Votator the air is admixed with the slurry while the slurry is cooled. As the air sparging or aeration step begins, the temperature of the mixture is reduced to promote sufficient crystallization of the oleaginous composition for formation of the filler cream laminate. In embodiments of the invention, the slurry temperature may be reduced to between about 70° F. and about 80° F. Reducing the temperature of the mixture or filler cream composition, preferably produces a high concentration of beta-prime fat crystals in the filler cream. Beta-prime fat crystals impart stable aerating properties to a filler cream.

The step of air sparging, which includes mixing and cooling the filler cream composition, is used to adjust the specific gravity of the filler cream to less than about 1.3, preferably to within the range of from about 0.7 to about 1.0, most preferably from about 0.85 to about 0.95. The air sparging and rapid mixing or whipping of the slurry is generally conducted to reduce the filler cream specific gravity at least about 15%, preferably at least about 20%.

The base cakes or cookie pieces used with the filler cream of this invention need not be made from any special formulas. They are preferably reduced fat cookie formulations obtained by reducing the amount of shortening or fat of a conventional cookie base cake formulation by at least about 25% by weight.

The sandwich cookies may be assembled in conventional manner by depositing a slice, or layer of the reduced fat filler cream upon a bottom cookie base cake, and depositing a top cookie base cake upon the filler cream laminate to obtain a sandwich, and then cooling the sandwich. The reduced fat sandwich cookies may have a water content of less than about 3.5% by weight of the sandwich cookie, and a water activity or relative humidity of less than about 0.4, preferably less than about 0.35.

The following examples further illustrate the present invention whereby all parts, ratios, and percentages are by weight and all temperatures are in degrees F. unless otherwise indicated:

EXAMPLE 1

The ingredients and their relative amounts which may be used to produce a substantially anhydrous filler cream with at least 20% by weight less fat for making reduced fat sandwich cookies are:

| | Quantity | |
|---|---|---|
| Ingredients | Relative Amount (By Weight) | Weight %, based on Total Weight |
| Sucrose, 4X | 100.00 | 63.03 |
| Oleaginous Composition | 41.38 | 26.08 |
| Glycerol (about 96% glycerol, 4% water) | 15.94 | 10.05 |
| Vanillin | 0.09 | 0.05 |
| Dimodan LSK (Emulsifier) | 1.25 | 0.79 |
| TOTAL | 158.66 | 100.00 |

The oleaginous composition may be a refined, bleached, partially hydrogenated and deodorized soybean oil with up to about 4% hardened cottonseed oil or hardened soybean oil. The chemical and physical properties of the oleaginous composition may be:

| | | |
|---|---|---|
| Initial Peroxide Value, meq/kilo | 1.0 Maximum | AOCS Method Cd 8–53 |
| % Free Fatty Acid (as Oleic) | 0.05 Maximum | AOCS Method Ca 5a–40 |

-continued

| | | |
|---|---|---|
| Melting Point, °F. (Wiley) | 103.0–108.0 | AOCS Method Cc 2-38 |
| Congeal Point, °C. or Mettler Drop Point °C. | 31.0–33.0 | AOCS Method Cc 14–59 or AOCS Method Cc 18–80 |
| AOM Stability (hours) | 100 Minimum | AOCS Method Cd 12–57 |
| Color (Lovibond) | 1.5 Red Maximum | AOCS Method Cc 13b–45 |
| Solid Fat Index, | | |
| 50° F. (10.0° C.) | 42.0–47.0 | AOCS Method Cd 10–57 |
| 70° F. (21.1° C.) | 27.0–32.0 | |
| 80° F. (26.7° C.) | 22.0–27.0 | |
| 92° F. (33.3° C.) | 11.0–14.0 | |
| 104° F. (40.0° C.) | 1.5–6.0 | |

The filler cream may be prepared continuously by first heating the oleaginous composition to about 120° F. to liquefy it. The Dimodan LSK emulsifier may be heated to about 130° F. to liquefy it. The glycerin may be preheated to about 100° F. The emulsifier, the glycerin and the vanillin flavoring may then be added sequentially to the heated oleaginous composition with mixing to obtain a substantially homogeneous emulsion. The mixture may then be held until the temperature of the mixture returns to about 120° F. The oil mix and the room temperature sucrose may then be combined and admixed in a continuous mixer with heating to obtain a slurry temperature at the output end of the mixer of about 95° F.

The slurry may then be transferred to an agitated holding tank and then pumped via piping to a Votator scraped wall heat exchanger. The slurry temperature entering the Votator may be elevated a few degrees due to pumping, to about 96° F. to 98° F. The Votator may be cooled by glycol flowing in a jacket countercurrently to the slurry which is pumped through the Votator. A glycol jacket temperature of about 40° F. to 45° F. may be used. The air may be injected into the slurry using a mixing "T" at the inlet of the Votator at a pressure of about 95 to 125 psig. In the Votator, the air may be admixed with the slurry while the slurry is cooled to an exit temperature of about 73° F. to 78° F. The specific gravity of the filler cream exiting the Votator may be about 0.9. The water content of the filler cream may be less than about 1% by weight, and the water activity or relative humidity may be about 0.25 to about 0.3.

Reduced fat sandwich cookies may be continuously produced by laminating the filler cream between two reduced fat rotary molded cookie base cakes. The base cakes may be transferred from a baking oven to an icing or filler cream depositing or laminating station for assembly of the sandwich cookie. The base cakes may be at a temperature of about 82° F. to 86° F. and have a Brabender (12 min.) moisture content of about 1.8% by weight to about 4.5% by weight for deposition of the filler cream. The reduced fat sandwich cookies may be assembled by first depositing a slice of the filler cream upon the reduced fat, bottom cookie base cake. Then, a reduced fat, top cookie base cake may be deposited upon the filler cream laminate to obtain a sandwich. The sandwich cookie may then be cooled in a cooling tunnel to less than 70° F. and then packaged in moisture proof packaging. The reduced fat sandwich cookies may have a water content of less than about 3% by weight of the sandwich cookie, and a water activity or relative humidity of about 0.3 to about 0.35.

EXAMPLE 2

Different emulsifiers including combinations of emulsifiers were used to prepare filler creams having their fat content reduced by at least 20% by weight to evaluate their ability to prevent glycerine/fat separation, improve machinability, and to incorporate air into the fat/polyol matrix. The emulsifiers evaluated and some of their characteristics are presented in Table 2:

TABLE 2

CHARACTERISTICS OF TESTED EMULSIFIERS

| Type | Chemical Composition | Fat Source | Iodine Value | Form | Supplier |
|---|---|---|---|---|---|
| Dimodan LSK | Monoglycerides | Sunflower Oil | App 105 | Soft Plastic | Grindsted |
| Dimodan BPTK | Monoglycerides | Palm Oil | App 45 | Block | Grindsted |
| Dimodan OK | Monoglycerides | Soybean Oil | App 60 | Block | Grindsted |
| Myverol 18-99 | Monoglycerides | Rapeseed Oil | App 95 | Soft Plastic | Eastman Kodak |
| Myverol 18-85 | Monoglycerides | Cottonseed Oil | App 95 | Plastic | Eastman Kodak |
| Tween-60 | Polyoxyethylene (20) Sorbitan Monostearate | | NA | Soft Plastic | ICI |
| Span-60 | Sorbitan Monostearate | | NA | Powder | ICI |
| Aldo MS | Mono and Diglycerides | | Max. 3 | Beads | Lonza |
| Emplex | Sodium Stearoyl Lactylates | | NA | Small Beads | American Ingredients |

The oleaginous composition, glycerin, and vanillin used in making the filler creams were the same as described in Example 1. The sucrose used had a granulation of 6×. In formulations 1 through 3, Dimodan LSK was used alone or in combination with other emulsifiers. In formulations 4 through 6, and comparative formulations 1 through 3, emulsifiers other than Dimodan LSK were used. The ingredients and their relative amounts used in each of the formulations are presented in Table 3:

TABLE 3

FILLER CREAM FORMULATIONS
(WEIGHT % BASED ON TOTAL WEIGHT)

| Ingredients | #1 | #2 | #3 | #4 | #5 | #6 | Comp. #1 | Comp. #2 | Comp. #3 |
|---|---|---|---|---|---|---|---|---|---|
| 6X pwd sucrose | 63.03 | 63.03 | 63.06 | 63.10 | 63.10 | 63.10 | 63.10 | 63.10 | 63.03 |
| oleaginous comp. | 26.08 | 26.06 | 25.62 | 26.15 | 26.15 | 26.15 | 26.15 | 26.15 | 26.81 |
| glycerin | 10.05 | 10.05 | 10.01 | 9.86 | 9.86 | 9.86 | 9.86 | 9.86 | 10.05 |
| vanillin | 0.05 | 0.05 | 0.05 | 0.10 | 0.10 | 0.10 | 0.10 | 0.10 | 0.05 |
| Dimodan LSK | 0.79 | 0.79 | 0.79 | — | — | — | — | — | — |
| Tween-60 | — | 0.02 | — | — | — | — | — | — | — |
| Emplex | — | — | 0.47 | — | — | — | — | — | — |
| Dimodan OK | — | — | — | 0.79 | — | — | — | — | — |
| Myverol 18-99 | — | — | — | — | 0.79 | — | — | — | — |
| Myverol 18-85 | — | — | — | — | — | 0.79 | — | — | — |
| Dimodan BPTK | — | — | — | — | — | — | 0.79 | — | — |
| Aldo-MS | — | — | — | — | — | — | — | 0.79 | — |
| Span 60 | — | — | — | — | — | — | — | — | 0.02 |
| Tween 60 | — | — | — | — | — | — | — | — | 0.04 |
| TOTAL | 100.0 | 100.0 | 100.0 | 100.0 | 100.0 | 100.0 | 100.0 | 100.0 | 100.0 |

The glycerine/fat separation, machinability, and aeration results for the nine formulations are presented in Table 4:

TABLE 4

GLYCERINE/FAT SEPARATION, MACHINABILITY AND AERATION RESULTS

| Formulation | Emulsifier | Approx. Iodine Value | Wt. of Emulsifier | Glycerine/ Fat Separation | Machine- ability | Aeration | Comments |
|---|---|---|---|---|---|---|---|
| 1 | Dimodan LSK | 105 | 0.79 | none | excellent | excellent | good mouthfeel, no or little back pressure, constant flow |
| 2 | Dimodan LSK Tween-60 | 105 N/A | 0.79 0.02 | none | excellent | excellent | same as Dimodan LSK by itself |
| 3 | Dimodan LSK Emplex | 105 N/A | 0.79 0.47 | none | very good | very good | sets up fast, some back pressure |
| 4 | Dimodan OK | 60 | 0.79 | none | very good | very good | good mouthfeel, some back pressure, constant flow |
| 5 | Myverol 18-99 | 95 | 0.79 | none | excellent | excellent | good mouthfeel, constant flow |
| 6 | Myverol 18-85 | 95 | 0.79 | none | good | good | good flow |
| Comparative 1 | Dimodan BPTK | 45 | 0.79 | high | very bad | bad | difficult to pump, high back pressure, inconsistent flow |
| Comparative 2 | Aldo-MS | Max 3 | 0.79 | high | bad | bad | cannot be pumped |
| Comparative 3 | Span 60 Tween-60 | N/A N/A | 0.02 0.04 | high | bad | bad | soapy flavor, difficult to pump, high back pressure |

What is claimed is:

1. A substantially anhydrous filler cream for reduced fat sandwich cookies comprising at least one sugar, an oleaginous composition, a polyol for increasing the air holding capacity, body, and lubricity of the filler cream, and an emulsifier for preventing separation of said polyol from said oleaginous composition and for improving mouthfeel and air holding capacity of the filler cream, said emulsifier comprising monoglycerides and having an iodine value of at least about 60, said filler cream being aerated by injection of air to reduce the specific gravity to about 0.7 to about 1.0.

2. A filler cream as claimed in claim 1 wherein said polyol comprises glycerol.

3. A filler cream as claimed in claim 1 wherein said polyol comprises glycerol and said emulsifier comprises at least about 80% by weight monoglycerides.

4. A filler cream as claimed in claim 1 wherein said emulsifier has an iodine value of from about 80 to about 120.

5. A filler cream as claimed in claim 1 wherein said emulsifier comprises at least about 90% by weight monoglycerides derived from sunflower oil, and has an iodine value of from about 90 to about 115.

6. A filler cream as claimed in claim 1 wherein the water content of said filler cream is less than about 3% by weight, based upon the total weight of said filler cream.

7. A filler cream as claimed in claim 1 wherein the polyol content of said filler cream is less than about 15% by weight, and said emulsifier content is less than about 3% by weight, said percentages being based upon the weight of said filler cream composition.

8. A filler cream as claimed in claim 7 wherein said emulsifier content is from about 0.25% to about 2% by weight, based upon the weight of said filler cream composition.

9. A filler cream as claimed in claim 1 wherein the particle size of said sugar is 4×.

10. A filler cream as claimed in claim 1 having a water activity or relative humidity of less than about 0.35.

11. A filler cream as claimed in claim 1 wherein the amount of said oleaginous composition is less than about 30% by weight, based upon the total weight of said filler cream.

12. A filler cream as claimed in claim 1 wherein the amount of said oleaginous composition is from about 20% by weight to about 30% by weight, based upon the total weight of said oleaginous composition and said at least one sugar.

13. A filler cream as claimed in claim 1 wherein the amount of said oleaginous composition is less than about 30% by weight, and the amount of sugar is at least about 60% by weight, based upon the total weight of said filler cream.

14. A filler cream as claimed in claim 1 wherein the water content of said filler cream is less than about 1% by weight, the polyol content is from about 7% by weight to about 12% by weight, the content of said monoglycerides is from about 0.25% by weight to about 2% by weight, said weight percentages being based upon the weight of said filler cream composition, said filler cream being aerated to a specific gravity of from about 0.85 to about 0.95 and having a relative humidity or water activity of less than about 0.3.

15. A reduced fat substantially anhydrous filler cream for sandwich cookies comprising at least one sugar, an oleaginous composition, glycerol for increasing the air holding capacity of the filler cream, and an emulsifier for preventing separation of said glycerol from said oleaginous composition, said emulsifier comprising at least about 85% by weight monoglycerides and having an iodine value of at least about 60, said filler cream being aerated by injection of air to reduce the specific gravity to about 0.7 to about 1.0.

16. A reduced fat sandwich cookie comprising base cakes and a filler cream composition as claimed in claim 15 between said base cakes.

17. A reduced fat sandwich cookie as claimed in claim 16 having a water activity or relative humidity of less than about 0.4.

18. A reduced fat sandwich cookie as claimed in claim 16 wherein the water content is less than about 3.5% by weight, based upon the total weight of said sandwich cookie.

19. A method for reducing the fat content of a filler cream for sandwich cookies comprising replacing a portion of the shortening or fat of the filler cream with glycerol and an emulsifier, said emulsifier comprising monoglycerides having an iodine value of at least about 60, and aerating the filler cream by injection of air to obtain a reduced fat filler cream, wherein the weight ratio of the amount of glycerol to the amount of oleaginous composition which it replaces is from about 0.85 to about 1.6, and wherein the aeration reduces the specific gravity to about 0.7 to about 1.0.

20. A method for reducing the fat content of a filler cream as claimed in claim 19 wherein said emulsifier comprises at least about 90% by weight monoglycerides derived from sunflower oil, and has an iodine value of from about 90 to about 115.

21. A method for reducing the fat content of a filler cream as claimed in claim 19 wherein the water content of said reduced fat filler cream is less than about 5% by weight, based upon the total weight of said reduced fat filler cream.

22. A method for reducing the fat content of a filler cream as claimed in claim 19 wherein the glycerol content of said reduced fat filler cream is less than about 15% by weight, and the emulsifier content of the reduced fat filler cream is less than about 3% by weight.

23. A method for reducing the fat content of a filler cream as claimed in claim 22 wherein said emulsifier content of the reduced fat filler cream is from about 0.25% to about 2% by weight.

24. A method for reducing the fat content of a filler cream as claimed in claim 19 wherein the aeration reduces the specific gravity to 0.85 to 0.95.

25. A method for making a filler cream for reduced fat sandwich cookies comprising admixing an oleaginous composition, a polyol, and an emulsifier to obtain an emulsion, said emulsifier comprising monoglycerides having an iodine value of at least about 60, admixing said emulsion with at least one sugar at a temperature which is sufficiently low so as to avoid separation of the oleaginous composition and the polyol and to obtain a substantially homogeneous slurry, injecting air into the slurry and cooling the slurry to obtain a filler cream composition having a specific gravity of from about 0.7 to about 1.0.

26. A method for making a filler cream as claimed in claim 25 wherein said emulsion and said at least one sugar are admixed to obtain a slurry having a temperature of about 85° F. to about 105° F.

27. A method for making a filler cream as claimed in claim 25 wherein said emulsion and said at least one sugar are admixed to obtain a slurry having a temperature of about 90° F. to about 100° F.

28. A method for making a filler cream as claimed in claim 25 wherein the slurry is cooled to a temperature of about 70° F. to about 80° F. while mixing with said injected air to obtain a filler cream composition having a specific gravity of from about 0.85 to about 0.95.

29. A method for making a filler cream as claimed in claim 25 wherein the amount of said oleaginous composition is less than about 30% by weight, based upon the total weight of said filler cream.

* * * * *